United States Patent Office 3,538,116
Patented Nov. 3, 1970

---

3,538,116
PREPARATION OF ACETONE GLUCOSE
James P. Hicks, Galesburg, Robert E. Gramera, Golfview Hills, Hinsdale, and Hyman M. Molotsky, Chicago, Ill., assignors to CPC International Inc., New York, N.Y., a corporation of Delaware
No Drawing. Filed Feb. 13, 1967, Ser. No. 615,307
Int. Cl. C07d 13/00
U.S. Cl. 260—340.9                    8 Claims

ABSTRACT OF THE DISCLOSURE

Covers a method of preparing diacetone glucose. Particularly covers a process of making diacetone glucose under carefully controlled conditions via an acid-catalyzed reaction. Also covers a procedure for making monoacetone glucose from diacetone glucose through ion exchange techniques. In addition, cover a continuous method of synthesizing diacetone glucose, as well is concerned with synthesizing monoacetone glucose from glucose by proceeding through the intermediate diacetone glucose without isolation of the diacetone derivative.

---

A number of procedures are known, and have been described in the literature for preparing diacetone glucose. In all instances the proposed methods have one or more drawbacks which make them unacceptable for commercial adaptation. For example, the techniques set out are deficient in one or more areas of requiring gross volumes of acetone, necessary use of drying agents such as cupric sulfate or calcium chloride during the reaction period, and excessive requirements of reaction time. These required expedients have hindered attempts to provide a method whereby diacetone glucose can be efficiently produced commercially in high volume runs, at relatively high yields, and at a minimum cost and capital expenditure.

In like manner, monoacetone glucose production on a commercial scale has also been hindered, since no simple procedure is known for its production without it being concatenated with a first formation of diacetone glucose. Thus, the disadvantages of providing diacetone glucose via the known procedures are likewise present in making the monoacetone derivative through the diacetone intermediate. In addition, even if a simplified and economically attractive method of making diacetone glucose were known, no commercially acceptable procedure is set forth in the literature for preparing the monoacetone glucose derivative from the diacetone glucose material. It has generally been proposed that diacetone glucose be conventionally hydrolyzed with a number of reagents to yield the monoacetone form. However, these procedures generally result in poor yields, require multi-step preparative techniques including complicated product work-up, or else necessarily require close monitoring and control, which sensitive procedures are not particularly suitable to adaptability to a large scale commercial operation. In many instances, hydrolysis of the diacetone glucose to the monoacetone material is accompanied by severe decomposition, and other serious side-effects in the proposed processes.

It therefore becomes an object of the invention to provide a method of preparing diacetone glucose.

Another object of the invention is to provide a process of making diacetone glucose which may be adaptable to commercial scale-up.

A specific object of the invention is to provide a method of synthesizing diacetone glucose which may be carried out in a relatively short time without resort to drying agents, and does not require excessive volumes of acetone reactant.

Still another object of the invention is to provide a process of preparing diacetone glucose in a continuous manner, which process is particularly suitable to use in an industrial installation.

In yet another object of the invention, a process of making monoacetone glucose is provided.

A still further object of the invention is to provide a method of making monoacetone glucose from the diacetone derivative in a one-step procedure requiring minimal product purification, which method results in excellent yields of the monoacetone material.

A special object of the invention is to provide a method of making monoacetone glucose by first preparing the diacetone glucose intermediate from a special reaction of glucose with acetone, and subsequently preparing the monoacetone material without first isolating the diacetone parent.

Other objects will appear hereinafter.

In accordance with the invention we have discovered a simplified, and extremely efficient procedure for making diacetone glucose. This mode of synthesis is particularly adapted to a continuous manner of making diacetone glucose on a commercial scale. We have also discovered a procedure for synthesizing the monoacetone glucose derivative from the diacetone material. This may be accomplished by starting with diacetone glucose itself, or else may be carried out in a single procedure beginning with acetone and glucose reactants, without resort to isolating the intermediate diacetone material.

Broadly speaking, diacetone glucose is prepared by reacting substantially dry acetone with glucose in relatively low molar ratios of acetone to glucose in presence of a mineral acid catalyst at a specific temperature ranging from about 45° C. to about 80° C., and for a duration of time varying from about ¼ hour to about 10 hours. The diacetone glucose is then recovered from the excess acetone. To the best of our knowledge this is the first disclosure of a method which is particularly adaptable to commercial use, due to relatively low volume of acetone required. The procedure is also particularly attractive in that no drying agents need be present during the reaction, and the entire reaction is carried out at a shorter time than heretofore thought possible.

The preparation of monoacetone glucose via the diacetone glucose starting material is carried out by contacting an aqueous solution of diacetone glucose with a weak acid cation exchange resin under a specific condition of temperature, namely within the range of about 75° C. to about 90° C. The monoacetone glucose is then removed from the resin, used as such in aqueous solution or further purified and isolated as a crystalline solid.

PREPARATION OF DIACETONE GLUCOSE

In the instant invention diacetone glucose, that is, 1,2;5,6 - di - O-isopropylidene-α-D-glucofuranose, is prepared by reacting glucose with acetone under the specific conditions set out hereinafter. Excellent yields are realized if these directions are carefully followed. The reaction itself proceeds as follows:

Equation No. I

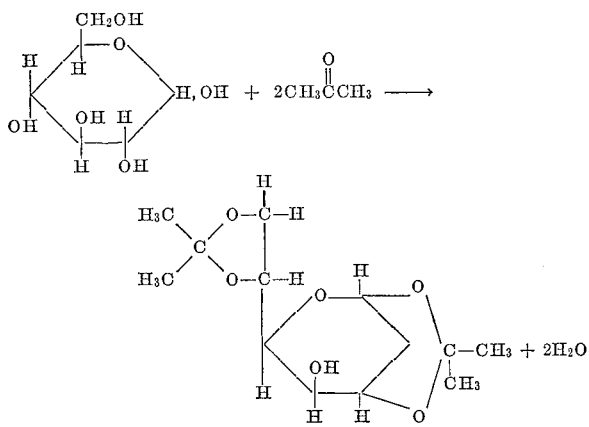

As is apparent, the above reaction actually proceeds through condensation of two moles of acetone with the furanose form of glucose. Since this form has two cis vic-glycol groups at both the 1 and 2 positions, and the 5 and 6 positions this structure is available for the condensation depicted above. Thus the 1,2;5,6-diacetonide derivative II is achieved. This form, of course, is fixed, that is, there is no mutarotation.

With more specific regard to the invention, less than 10 moles of acetone are needed per mole of glucose utilized. In most instances 4–10 moles of acetone per mole of glucose are employed as reactants yielding excellent results in terms of process efficiency, yields etc. This favorably compares to prior art procedures set out in the literature which require a minimum of 15 moles per mole of glucose, and in most instances require in the neighborhood of 20–25 moles of acetone per mole of glucose reactant.

Again the reaction is completed in substantially less time than heretofore thought possible, and most times can be completed in 1/4–10 hours, and more often within 1/2 hour and 5 hours. In the most preferred embodiment the reaction is completed in a batch procedure from 1/2 hour to about 2 hours. If a continuous procedure is employed the residence time of reactants before withdrawal of products is substantially the same as set out above. The actual time for any one run, batch or continuous, is, of course, dependent upon other presented variables such as molar ratio of reactants, temperature, etc.

As set out above the temperature of reaction may range from about 45° C. to about 80° C., more often is 50–60° C. and may be effected at either atmospheric or elevated pressures, say as high as 100 p.s.i.g.

In a greatly preferred embodiment, the reaction is run under the reflux temperature of acetone at ambient pressure, that is, at about 56° C.

The reaction itself is heterogeneous, that is, the glucose is only soluble in acetone to a few p.p.m. However, as the reaction proceeds the diacetone glucose product is soluble in the acetone phase, and can be easily recovered from excess acetone acting then as a solvating agent.

As alluded to above, the instant reaction is acid-catalyzed. Any mineral acid may be employed such as sulfuric, hydrochloric, phosphoric, nitric, etc. However, most preferred is sulfuric acid due to availability, low cost, excellent activity, and easy removability in the subsequent purification procedure. Generally, from about 0.01 to about 0.5 mole of acid per mole of glucose are utilized, and more often from about 0.02 to about 0.2 mole of acid per mole of glucose reactant. The acid is not consumed in the condensation reaction, but is present as a true catalyst.

It is important that the system be free of water, since yields are materially decreased and reactivity diminished greatly if water is present to inhibit the condensation reaction. Thus, the reagents employed must be substantially dry. In most instances the acetone reactant will have less than a few p.p.m. of moisture present. The mineral acid should be concentrated, and free of substantial amounts of water. Suitable sulfuric acid reagents include both 98% sulfuric and fuming sulfuric acid.

Extraneous solvents other than excess acetone may also be present as long as these solvating materials do not interfere with the reaction. Generally, use of an additional solvent is undesirable, since both yield and reactivity are diminished due to excessive solvating and debilitation of catalyst.

In a greatly preferred embodiment in the invention the reaction is run in a continuous manner. Generally, the reaction is allowed to proceed after start-up until excess acetone present contains dissolved therein a substantial amount of the desired diacetone glucose product. This product is removed from the reaction vessel periodically or continuously bled off as a solution in acetone, while additional dry acetone is metered in, as well as glucose when needed. Of course, excess acetone stripped from the product may be reused in the process after drying, if necessary. Thus, the process is admirably suited to operation in a continuous manner, particularly when run under reflux conditions. As mentioned above, residence time under conditions of reflux is relatively short, say about 1/2–2 hours.

In still another embodiment of the invention, the acetone solution of product is purified by neutralization with appropriate base. This step may be run whether the processor is working the reaction in a continuous manner or in batches. After neutralization the salt formed is then easily and conveniently removed, and product subsequently isolated. When sulfuric acid is used as the mineral acid catalyst, we have found that a particularly desirable neutralizing agent is ammonia. In the particular acetone solvent system involved, upon cooling the ammonium sulfate salt formed via the neutralization step is precipitated out almost quantitatively from solution, leaving behind little salt contaminant. This ammonium sulfate salt is then conveniently removed from the product dissolved in acetone by a convention step such as by a filtration technique.

Removal of the desired diacetone glucose product from acetone solvent may be effected via a wide number of known isolation operations. However, the invention is particularly suited toward purification of product as follows whether obtained from a batch-wise or continuous method.

After salt removal the diacetone glucose dissolved in acetone is stripped of acetone preferably through heat distillation. During this step water and preferably hot water is simultaneously added in slugs or continuously. The diacetone glucose is concentrated to about a 5–10% solids content at this point, which amount is soluble in the hot water solution. The solution is then cooled, from which chilled solution the diacetone glucose crystallizes. The crystals are then isolated by any suitable technique such as by filtration.

The mother liquor from the filtration step may also be worked-up to recover additional diacetone glucose and increase over-all yield. One excellent method is to spray-dry the mother liquor and recover therefrom the desired product. As is readily apparent, the purification technique just described is relatively inexpensive and simple to carry out, and particularly eliminates relatively costly toxic or explosive reagents such as petroleum ethers or like organic solvents, often used in purification procedures.

Another variation of this purification method involves removal of a major portion of acetone, say by distillation, followed by addition of hot water while the remainder of acetone is stripped off. When a portion of the acetone is removed by stripping from the diacetone glucose product prior to addition of any water, it is preferred that at least 50% of the acetone be removed prior to water addition. Most preferably 50–75% of the acetone is removed. The remainder of the acetone, of course, is removed during the subsequent addition of hot water.

The overall process of the invention is particularly ameliorated by the following added step. Here, subsequent to the neutralization step, but prior to isolation of product, the solution of acetone containing product is further treated to remove recrement such as residual ash salts remaining, say in form of ammonium sulfate, condensation impurities, reducing sugars, etc. In this step the diacetone glucose dissolved in solvent, and preferably dissolved in water at about a 5–10% solids content is contacted with an anion exchange resin. This resin may be either a strong base or weak base resin, though the former is preferred.

The strongly basic anion exchange resins which are preferably employed for the purpose of the invention are reaction products of a tertiary amine and a vinyl aromatic resin having halo methyl groups attached to the aromatic nuclei in the resin. Another class of anionic exchange resin suitable to purify the diacetone glucose solutions are the reaction products of the tertiary carbocyclic or heterocyclic amines and vinyl aromatic resins having halo methyl groups attached to the aromatic nuclei in the resin. The vinyl aromatic resins employed as starting materials in making the anion resins employed in the preferred practice of the invention are normally solid benzene-insoluble copolymers of a monovinyl aromatic compound and a polyvinyl aromatic compound. The copolymer is normally made up of 0.5 to 40% by weight of polyvinyl material, and preferably 0.5 to 20% by weight. Examples of suitable monovinyl aromatic compounds are styrene, alpha methyl styrene, chlorostyrene, vinyl toluene, vinyl naphthalene and homologues thereof, capable of copolymerizing, as disclosed, for example, in U.S. Pat. 2,614,099. Examples of suitable polyvinyl aromatic compounds are divinyl benzene, divinyl toluene, divinyl xylene, divinyl naphthalene, and divinylethyl benzene. These resins are halo methylated as described, for example, in U.S. Pat. 2,614,099 preferably to introduce an average of 0.2 to 1.5 halo methyl groups per aromatic nucleus in the copolymer, and then reacted with a tertiary amine to introduce a quaternary ammonium anion exchange group. Examples of suitable tertiary amines are trimethylamine, triethylamine, tributylamine, dimethylpropanolamine, dimethylamine, methylamine, dioctyl ethanolamine, and homologues thereof. The preferred tertiary amines can be described as mono- and di-alkyl N-substituted alkanol and alkanediolamines. A suitable anion exchange resin of the type described above is available as Amberlite IRA–401–S, preferably employed in the hydroxide form.

The weak base resins are prepared in a similar manner except that primary and secondary amines are reacted with the halo alkylated resins. Examples of such amines are methylaniline, dimethylamine, N-butylamine, dibutylamine, isobutylamine, aniline, benzidines, toluidines, xylidines, alpha and beta naphthalenediamine, benzylamine, dibenzylamine, ethylenediamine, cyclohexylamine, diethylenetriamine, triethylenetetramine, tetraethylenepentamine, propylenediamine, dipropylenetriamine, and homologues thereof. The anion exchange resins are also prepared by halogenating the resin molecule and then introducing an anionic exchange group.

Examples of strongly basic anionic exchange resins which can be employed in the practice of the invention are those described in U.S. Pats. 2,591,573; 2,597,440; 2,597,494; 2,614,099; 2,630,427; 2,632,001 and 2,632,000. Examples of weakly basic anionic exchange resins which can be employed are those described in U.S. Pats. 2,582,098; 2,597,439, and 2,597,491.

The contact of product solution with resin may be effected in a variety of ways, but most preferably is carried out by either the slurry or column techniques. Generally the slurry of resin and product dissolved in a solvent such as water, or solvated product being run through a resin column should be kept hot, say about 50–70° C. to prevent premature crystallization and trapping of product within resin voids and on the resin surface.

Other than by treatment with resin, the diacetone glucose product solution may also be purified in a number of other ways. For example, with or without benefit of resin treatment the diacetone glucose liquor may be also treated with absorbants such as bone or animal char, activated carbon, etc. One particular technique involves concentrating a 5–10% aqueous solution of diacetone glucose product to about 10–20% solids, treating the hot solution with activated carbon, filtering the carbon from the product solution and cooling to obtain the crystalline product. Again the mother liquor from this crystallization may be spray-dried to yield additional product. The wet crystalline cake from the above filtration step may be dried in a vacuum oven, say at about 140° F., and the diacetone product obtained as a white solid having a melting point of 107–109° C. The most preferred carbon material useful in removing impurities is activated carbon.

When an aqueous solution of diacetone glucose is treated with carbon to remove impurities therefrom, it is preferred that the solids content range from about 10 to about 20% by weight, and that the diacetone glucose product be treated while hot in aqueous solution.

If the above set-out steps are carefully followed, yields of diacetone glucose product in the range of 80–90% or even higher are easily obtainable, whether the procedure effected is a batch technique or a continuous method.

Diacetone glucose may be used for a variety of end-uses, or as an intermediate to provide other derivatives. For example, the diacetone glucose may be used to produce derivatives having potential pharmaceutical use. Due to its remaining monofunctional character it is used as an intermediate to provide many dextrose derivatives. For example, it is reacted with fatty acids to produce useful products. Again, the product is employed as a plasticizer for production of synthetic polymers, as a surfactant or is homopolymerized by a Lewis acid catalyst.

PREPARATION OF MONOACETONE GLUCOSE

Also falling within the ambit of the invention is the production of monoacetone glucose in a process which may be accomplished with ease and facility, yet is relatively simple, and finally produces excellent yields of product. In its broadest outline the method is carried out by contacting a source of diacetone glucose in some solvent with a weak acid cationic exchanger under a critical temperature range of 75–90° C. This phase of the invention is particularly demarcated by these two aspects.

The diacetone glucose hydrolyzed in this step is preferably dissolved in hot water, and the resin contact thereafter made within the above temperature range. For excellent yields it is again greatly preferred that the aqueous solution of the diacetone glucose contain 5–10% solids, the cationic exchanger be in hydrogen form, and the temperature of reaction narrowly range between 78 and 82° C. If these conditions are followed, yields of monoacetone glucose as high as 95% or higher may be obtained with little difficulty.

The actual resin contact may be accomplished in any manner as long as the treatment involves intimate association of the diacetone glucose with the exchanger, whereby hydrolysis takes place according to the equation set forth below.

Equation No. II

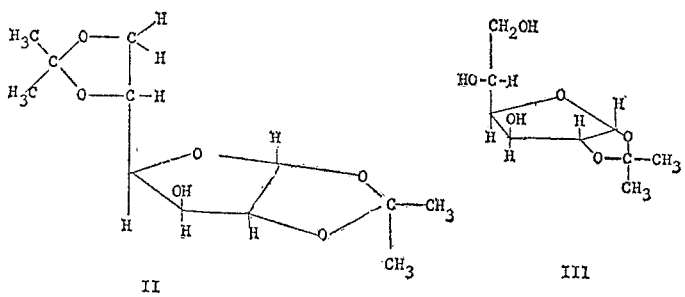

In one mode of operation the resin contact is carried out by slurrying the resin in solution of diacetone glucose, preferably a hot aqueous solution, and allowing the hydrolysis to take effect while agitating the resultant slurry. In this technique, reaction is generally considered complete in a time ranging from about ¼ to about 2 hours.

Another preferred embodiment to form monoacetone glucose involves passing diacetone glucose solution through a resin column at a rate sufficient to insure reaction. The contact time of the solution may vary somewhat but typically again ranges from about 1/10 to about 3 hours. The effluent monoacetate glucose solution is then collected and product isolated if desired. Likewise, the product may be maintained in solution form, and utilized as such.

In a greatly preferred embodiment in producing monoacetone glucose, the aforementioned method of producing diacetone glucose is first utilized. In this case there is no necessity to isolate the diacetone glucose product, and the liquid form of diacetone glucose material may be directly utilized. For example, resin contact may be made with a solution of diacetone glucose such as an aqueous solution after stripping off excess acetone.

In preparing the monoacetone glucose derivative by starting with diacetone glucose according to the techniques described above, it is greatly preferred that the various steps described such as neutralization to remove salt, resin and charcoal purification, etc. be also practised to purify a suitable diacetone glucose sample useful herein.

It was interesting to note that if the temperature was varied outside the limits stated in producing monoacetone glucose, exceptionally poor yields were obtained or severe decomposition took place. Again, if other resin systems were employed and even a strong acid cationic exchanger, the process was essentially non-controllable. It appears that the unique system described above of specific combination of particular resin and temperature range is essential in order to realize yields of the magnitude envisioned with respect to monoacetone glucose production.

The weak acid cationic exchange resins useful in the invention are well-known and need little elaboration. Any suitable resin containing weakly acidic acid groups capable of exchaging cations is useful. The majority of these materials are resinous beads having carboxyl or phenolic groups containing exchangeable cations. When employed, it is greatly preferred the resin be in the hydrogen form. A typical weak acid cationic exchanger which may be employed is Amberlite IRC-50 in hydrogen form.

Thus, by an overall single procedure one can prepare monoacetone glucose in commercial quantities, starting with glucose and acetone as set out above, utilizing steps just mentioned to produce diacetone glucose, and following in a contiguous manner the just-mentioned monoacetone synthesis. Again, on an industrial scale both diacetone and monoacetone glucose derivatives can be simultaneously produced in any desired ratio by taking a portion of the aqueous diacetone glucose solution and utilizing it in the instant ion exchange technique, while recovering directly an aliquot of diacetone glucose.

The following examples illustrate typical preparations falling within the scope of the inventive concepts herein outlined. It is understood of course, that these examples are merely illustrative, and that the invention is not to be limited thereto.

EXAMPLE I

Diacetone glucose preparation

A mixture of anhydrous glucose (1 mole), acetone (9 moles) and sulfuric acid (0.012 mole) was stirred for 45 minutes at 75–80° C. in a closed autoclave. The mixture was then cooled to 20° C. and unreacted glucose filtered and reused in the next cycle. Ammonia was bubbled into the diacetone glucose filtrate until a pH of 7.0 was maintained. Precipitated ammonium sulfate was then removed by filtration, two-thirds of the acetone was stripped off and also used in the next run. Water at 60° C. was then metered into the product solution while stripping off the remaining acetone until the solids content of diacetone glucose in solution was about 6–7%. The hot aqueous diacetone glucose was then passed over a strong base anionic exchange resin, namely, Amberlite IRA–401–S in hydroxide form to remove impurities such as residual ammonium sulfate condensation products and reducing sugars. The resin-treated diacetone glucose liquor was concentrated at 70° C. to 15% solids, carbon treated at a 2% level, filtered from the carbon and cooled to 10° C. The wet crystalline cake was dried in a vacuum oven at 140° F. and obtained as a white solid with a melting point of 107–109° C. Crystalline diacetone glucose was attained in a first crop of about 70% yield. The mother liquor was spray-dried to yield an additional 20% of product, giving a total yield of 90%.

EXAMPLE II

Monoacetone glucose preparation

A diacetone glucose liquor in aqueous solution (6–7% solids) was utilized in this experiment. Specifically, a weak acid cationic exchange resin, Amberlite IRC–50 in hydrogen form was preheated to about 80° C. and added to this heated diacetone glucose aqueous liquor. Hydrolysis was then effected at about 80° C. During the contact period the resin slurry was stirred. After a reaction time of about 0.5 hour the resin was removed by rapid filtration and the resultant monoacetone glucose liquor concentrated up to about 60% solids. This material was carbon treated, and spray-dried to give a product having a melting point of 157–159° C. A further purification of the spray-dried monoacetone glucose crystalline product by crystallization from hot methanol yielded a product having a melting point of 159°–160° C. About a 95% yield was obtained in this run.

EXAMPLE III

Monoacetone glucose preparation

In this example the hydrolysis of diacetone glucose to monoacetone glucose was carried out according to the directions of Example II, with the exception that reaction temperature was varied in the runs. As can be seen from Table I below only after about a temperature of 75° C. does one achieve good yields of monoacetone glucose and absence of substantial amounts of unreacted diacetone glucose at the completion of the reaction runs. Above about 90° C. product decomposition and polymerization began to occur.

TABLE I

| Hydrolysis temp. in ° C. | Hydrolysis catalyzed with Amberlite IRC-50 | Percent D.E. (Dextrose equivalents) | Percent un-hydrolyzed diacetone glucose | Melting point of total crude product, ° C |
|---|---|---|---|---|
| 25 | 3 hours | 0.40 | 90.0 | 109 |
| 25 | 24 hours | 0.47 | 93.0 | 112 |
| 60 | 3 hours | 1.30 | 9.6 | 151 |
| 70 | 40 minutes | 1.18 | 12.5 | 146 |
| 75 | 3 hours | 5.30 | 0 | 158 |
| 80 | 25 minutes | 2.60 | 2.5 | 156 |
| 80 | 30 minutes | 3.00 | 2.0 | 157 |
| 80 | 40 minutes | 3.80 | 0 | 158 |
| 85 | 10 minutes | 2.50 | 3.0 | 153 |
| 85 | 12 minutes | 3.30 | 0 | 159 |
| 90 | 10 minutes | 3.50 | 1.8 | 159 |
| 90 | 12 minutes | 4.90 | 0 | 157 |

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

The invention is hereby claimed as follows:

1. An improved method of preparing diacetone glucose which comprises the steps of reacting together substantially dry acetone and glucose, in relative proportions of at least about 4 moles but less than 10 moles of acetone per mole of glucose, in the presence of a catalytic amount of a mineral acid, at a temperature in the range from about 45° C. to about 80° C., for a duration of time varying from about ¼ hour to about 10 hours, and recovering diacetone glucose and excess acetone from the reaction mixture.

2. The method of claim 1, wherein said reaction is effected in a time in the range from about ½ hour to about 5 hours.

3. The method of claim 2 wherein said reaction is effected at a temperature in the range from about 50° C. to about 60° C.

4. The method of claim 1 wherein said mineral acid catalyst is sulfuric acid.

5. An improved method of preparing diacetone glucose which comprises the step of reacting together substantially dry acetone and glucose in relative proportions of at least about 4 moles but less than 10 moles of acetone per mole of glucose, in the presence of a catalytic amount of a mineral acid, at a temperature in the range from about 45° C. to about 80° C., for a duration of time varying from about ¼ hour to about 10 hours, neutralizing the resultant mixture with base to form a salt of said mineral acid, removing said salt from said reaction mixture, and recovering said diacetone glucose and excess acetone from the reaction mixture.

6. The method of claim 5 wherein said mineral acid is sulfuric acid, and said neutralizing base is ammonia whereby an ammonium sulfate salt is formed which precipitated from said reaction mixtures, and is removed therefrom by filtration.

7. An improved method of preparing diacetone glucose which comprises the steps of reacting together substantially dry acetone and glucose in relative proportions of at least about 4 moles but less than 10 moles of acetone per mole of glucose, in the presence of a catalytic amount of a mineral acid, at about the reflux temperature of acetone, for a duration of time varying from about ¼ hour to about 10 hours; and recovering said diacetone glucose and excess acetone from the reaction mixture.

8. An improved method of preparing diacetone glucose which comprises the steps of reacting together substantially dry acetone and glucose in relative proportions of at least about 4 moles but less than 10 moles of acetone per mole of glucose, in the presence of a catalytic amount of sulfuric acid, at about the reflux temperature of acetone, for a duration of time varying from about ¼ hour to about 10 hours, neutralizing the resultant reaction mixture with ammonia whereby an ammoniumsulfate salt is formed which precipitates from said reaction mixture and is removed therefrom by filtration; and recovering said diacetone glucose and excess acetone from the reaction mixture.

References Cited

UNITED STATES PATENTS 2,554,152   5/1951   Osborne et al. _____ 260—209

OTHER REFERENCES

Danilov et al. "Chemical Abstracts," vol. 45 (1951), col. 7529; (Abstract of "Zhur Obshchei Khim," vol. 21 (1951), pp. 366–74).

ALEX MAZEL, Primary Examiner

J. H. TURNIPSEED, Assistant Examiner

U.S. Cl. X.R.

260—9, 209, 210